United States Patent [19]

Chiba

[11] 4,196,038
[45] Apr. 1, 1980

[54] DEVICE FOR EMBEDDING A METALLIC ANTENNA WIRE IN PLASTIC SHEET

[75] Inventor: Kenji Chiba, Tokyo, Japan

[73] Assignee: Central Glass Co., Yamaguchi, Japan

[21] Appl. No.: 864,442

[22] Filed: Dec. 27, 1977

Related U.S. Application Data

[63] Continuation-in-part of Ser. No. 626,444, Oct. 28, 1975, abandoned, and a continuation-in-part of Ser. No. 573,159, Apr. 30, 1975, abandoned.

[30] Foreign Application Priority Data

Apr. 30, 1974 [JP] Japan .................................. 49-49024
Oct. 31, 1974 [JP] Japan ........................... 49-132844[U]

[51] Int. Cl.² ............................................. B32B 31/00
[52] U.S. Cl. .................................. 156/433; 156/494; 156/499; 156/527; 156/582
[58] Field of Search ................ 156/166, 176, 177, 178, 156/306, 298, 322, 303.1, 433, 436, 499, 494, 523, 527, 582, 581; 140/93 R; 29/611; 219/522, 208; 343/712

[56] References Cited

U.S. PATENT DOCUMENTS

| | | | |
|---|---|---|---|
| 2,640,796 | 6/1953 | Langer | 156/176 |
| 2,813,960 | 11/1957 | Egle et al. | 219/522 |
| 3,098,782 | 7/1963 | Powers | 156/527 |
| 3,574,040 | 4/1971 | Chitwood et al. | 156/522 |
| 3,635,777 | 1/1972 | Bethge | 156/499 |
| 3,673,044 | 6/1972 | Miller et al. | 156/433 |
| 3,674,914 | 7/1972 | Burr | 156/166 |
| 3,810,805 | 5/1974 | Goldsworthy et al. | 156/530 |

*Primary Examiner*—Michael W. Ball
*Attorney, Agent, or Firm*—Wenderoth, Lind & Ponack

[57] ABSTRACT

A device for embedding a metallic antenna wire which can be heated in a sheet of a thermoplastic material. The device has a mounting table for mounting the sheet of thermoplastic material thereon, a guide head positioned above the table and movable in a predetermined pattern in a plane parallel to the surface of said table, a pressure means on the guide head for pressing the wire into the thermoplastic sheet as the guide head moves parallel to the table, wire supplying means on the guide head supplying the wire to the pressure means, and heating means on the guide head along the path of the wire from the wire supplying means to the pressure means for heating the wire to a temperature which is sufficient, when the pressure means presses the heated wire onto the sheet, to plasticize the sheet sufficiently that the pressure means embeds the wire in the sheet.

3 Claims, 3 Drawing Figures

DEVICE FOR EMBEDDING A METALLIC ANTENNA WIRE IN PLASTIC SHEET

This application is a continuation-in-part of U.S. patent application Ser. No. 626,444 filed Oct. 28, 1975, now abandoned, which in turn is a continuation-in-part of U.S. application Ser. No. 573,159 filed Apr. 30, 1975, now abandoned.

The present invention relates to a device for embedding a metallic antenna wire, such as copper wire, etc., into the surface of a sheet of a material such as a synthetic thermoplastic resin according to a predetermined pattern.

BACKGROUND OF THE INVENTION

Since the advent of the provision of antennas for automobile radios within the window glass of the automobile, it has been necessary to incorporate a fine strand of antenna wire in the sheet of bonding material which is used to bond the layers of glass together prior to sandwiching the sheet of bonding material between the layers of glass. This has lead to the necessity of providing some automatic means for embedding a strand of antenna wire or the like in such a sheet of bonding material.

OBJECTS AND BRIEF SUMMARY OF THE INVENTION

It is accordingly an object of the present invention to provide a device for embedding a metallic antenna wire, such as a copper wire in the surface of a sheet of thermoplastic resin which operates automatically yet reliably, and further which is easy to load with the antenna wire to be attached to the sheet.

This object is achieved by the provision of a device according to the invention which comprises a mounting table for mounting a sheet of thermoplastic material thereon, a guide head positioned above said mounting table and which is movable in a predetermined pattern in a plane parallel with the table, pressure means on the guide head for pressing the wire into the thermoplastic sheet as the guide head moves parallel with the table, wire supplying means on the guide head supplying the wire to the pressure means, and heating means on the guide head along the path of the wire from the wire supplying means to the pressure means for heating the wire to a temperature which is sufficient when the pressure means presses the heated wire onto the sheet, to plasticize the sheet sufficiently that the pressure means embeds the wire in the sheet.

BRIEF DESCRIPTION OF THE FIGURES

The construction of the present invention will be described in detail with reference to the accompanying drawings, in which.

Figure 1:
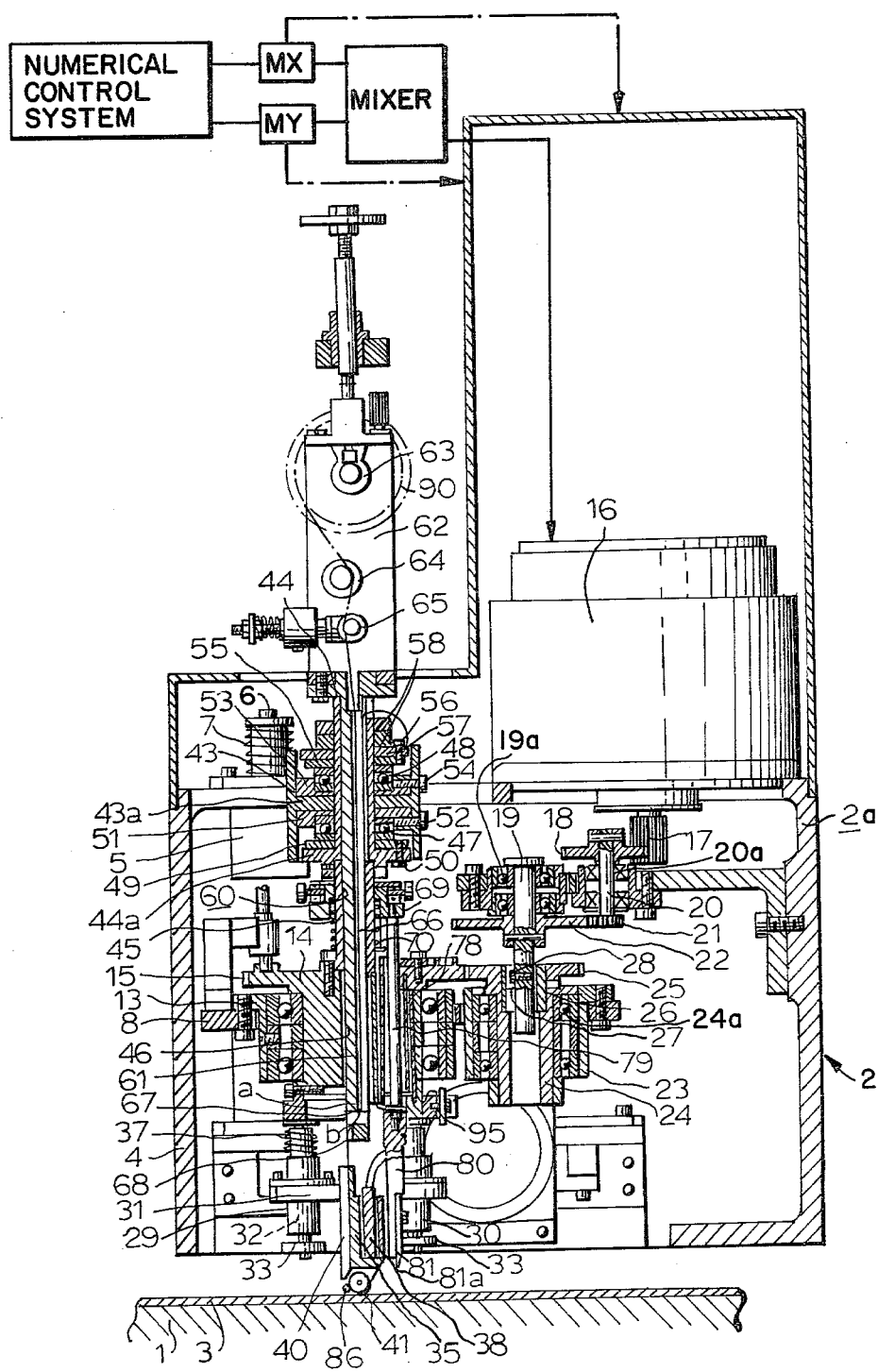
FIG. 1 is a cross-sectional view of the device of the invention.

Reference numeral 1 denotes a mounting table, and a guide head, generally indicated at 2, is disposed above the table 1 in such a way that the head can shift in a plane parallel with the upper surface of the mounting table 1, for example by a motor MX and a motor MY, shown schematically in FIG. 1, for driving the head in the X and Y directions, as shown in U.S. Pat. No. 3,715,945, and which motors are controlled by a conventional numerical control system (not shown). On the upper surface of the mounting table 1 is mounted a sheet 3 of a thermoplastic bonding agent, for example polyvinyl butyral. The head 2 has a casing 2a. A lifting rod 6 is supported for movement in the direction perpendicular to the mounting table 1 on a plurality of guides 5 having slide ball bearings therein, and mounted on a base plate 4, and the lifting rod 6 is resiliently urged in the upward direction by the resilient force of a coil spring 7 between base plate 4 and the upper end of shaft 6. Reference numeral 8 denotes a lifting plate fixed to the lower end of the lifting rod 6, and a horizontal plate 10 is fixed to the lower surface of the lifting plate 8 by means of a support body 9.

Reference numeral 11 denotes a rotary solenoid mounted on the casing 2a by means of a bracket 11a, and a roller 12 which swings in the vertical direction upon rotation of the core rod of the rotary solenoid and bears on the upper surface of the horizontal plate 10.

An annular body 14 is rotatably mounted on a bearing mounting 13 fixed to the lifting plate 8 by means of a radial ball bearing 14a and a gear 15 is formed on a flange portion on the upper part of the annular body 14.

Reference numeral 16 denotes a direction control motor mounted on the base plate 4, and a pinion gear 17 fixed to the output shaft is meshed with a gear 18 on a shaft 20. Shafts 19 and 20 are rotatably mounted in ball bearings 19a and 20a in two holes in a support member fixed to the casing 2a by means of radial ball bearings, and on the other end of the shaft 20 is mounted a gear 21. At the middle of the shaft 19 is fixed a gear 22 and the gear 22 is meshed with the gear 21.

Reference numeral 23 denotes a cylindrical body mounted in and fixed in a hole in the lifting plate 8, and a tubular body 24 is rotatably mounted in the cylindrical body 23 by a radial ball bearing 24a, and a gear 25 formed on the flange portion of the upper part of the tubular body 24 is meshed with the gear 15.

The lower portion of the shaft 19 is loosely fitted in the hollow portion of the tubular body 24. In a larger diameter portion of the upper part of the hollow portion of the tubular body 24 is fixed a pipe 26 and the shaft 19 is slidable in the pipe 26. A vertical groove 27 is formed in the inner wall of the pipe 26 in the axial direction of the pipe, and a projection 28 on the shaft 119 is slidably positioned in the groove 27.

Reference numerals 29 and 30 denote guide pipes fixed to a connecting member 31, and a shaft 32 is slidably positioned within each guide pipe is a slide ball bearing, respectively, and the upper end of each shaft 32 is fixed to the lower surface of the annular body 14. A stop member 33 is fixed to the lower end of each shaft 32. Collars 34 are fitted on the outer circumferential surfaces of the guide pipes 29 and 30, and a projecting member 36 having a holder member 35 projecting downwardly from an intermediate portion thereof is fixed to the collar 34. The guide pipes 29 and 30 are urged in the downward direction along the shafts 32 by the elastic force of springs 27, and the lower surface of the projecting member 36 is in resilient contact with the upper surface of the stop members 33. On the holder member 35 is a heater housing unit in which a heater 38 is provided and a strand guide groove 40 extends in the longitudinal direction thereof. A pressure roller 41 is rotatably and pivotally supported between a pair of parallel plates 35a extending from the lower end of the holder member 35. On the circumferential surface of the pressure roller 41 is a shallow V-groove for guiding the wire.

An insulating support body 43 is fixed on the upper end of a mounting member 42 mounted on the lifting plate 8, and in the center portion of the tubular portion 43b of the support body 43 is a disc portion 43a having a hole in the center. At the center portion of the disc portion 43a of the support body 43 is positioned a tubular body 44 made of an insulating material, and the lower end of the tubular body 44 is fixed to the upper end of a support tube 45. The lower end of the support tube 45 is fitted into a hole 46 that runs through the center portion of the annular body 14, and a flange portion at the lower portion of the support tube 45 is fixed to the upper surface of the rotary body 14 by means of a set screw. A pair of thrust ball bearings 47 and 48 is mounted on the outer circumferential surface of the tubular body 44.

A collar member 49 made of an electrically conductive material is fixed to the upper surface of a flange 44a on the tubular body 44 by means of a screw 50, and a collar member 51 made of an electrically conductive material is mounted on the lower surface of the disc portion 43a, and the collar member 51 is fixed to the tubular portion 43b of the support body 43 by means of a screw 52. The thrust ball bearing 47 is disposed between the collar members 49 and 51. A collar member 53 made of an electrically conductive material is mounted on the upper surface of the disc portion 43a, and the collar member 53 is fixed to the tubular portion 43b of the support body 43 by means of the screw 54. The lower surface of the thrust ball bearing 48 is mounted on the upper surface of the collar member 53, and a collar member 55 made of an electrically conductive material is mounted on the upper surface of the thrust ball bearing 48, and the collar member 55 is fixed to a pressure disc 57 made of an insulating material by means of a screw 56. The pressure disc 57, collar member 55, thrust ball bearing 47, collar member 53, disc portion 43a, collar member 51, and thrust ball bearing 47 are slidably fitted on the outer circumferential surface of the tubular body 44. Reference numeral 58 denotes a nut threaded to the upper threaded portion of the tubular body 44, and when the nut 58 is turned in the direction to tighten it, the end faces of the thrust ball bearing 48 are sandwiched tightly between the disc portion 43a and the pressure plate 57 by means of the collar members 53 and 55, and the thrust ball bearing 47 is tightly sandwiched between the disc portion 43a and the flange portion 44a by means of the collar members 51 and 49. A wire guide shaft 61 is positioned in the bore 60 of the tubular body 44 and the support tube 45 and the hole 46 through the annular body 14. A support frame 62 is fixed to the upper end of the guide shaft 61. The guide shaft 61 and frame 62 can be slidably removed from and reinserted into the bore 60. A bobbin 63 having the wire 90 mounted thereon is rotatably supported on the upper portion of the support frame 62, and a wire guide roller 64 and tension roller 65 are disposed on the support frame 62 below the bobbin 63. A wire guide groove 66 is provided in the wire guide shaft 61 in the longitudinal direction thereof, and the lower end of the guide groove 66 opens into a lateral hole 67 at a position in the vicinity of the lower end of the wire guide shaft 61. Reference numeral 68 denotes a wire guide groove extending parallel with the groove 66 from a position adjacent the lateral hole 67 to the lower end of the guide shaft 60, and the groove 68 is offset a predetermined distance in the lefthand direction at right angles in FIG. 1 with respect to the groove 66. Reference numeral 69 denotes a ring-shaped body slidably mounted on the support pipe 45, and which is resiliently urged in the upward direction by means of a spring 70. In the circumferential groove in the ring-shaped body 69 is a roller (not visible) that is rotatably supported at one end of a rocking arm 71. A point at about the center portion of the rocking arm 71 is rockably supported on a pivot 75 on a bracket 75a fixed on the lifting plate 8, and the other end of the rocking arm 71 is mounted on a transfer shaft 77 coupled to the core rod or a rotary solenoid 76 fixed to the lifting plate 8. A lifting shaft 79 is slidably positioned in a holder pipe 78 fixed to the annular body 14 by a screw and a thrust ball bearing, and the upper end of the lifting shaft 79 is fixed to the ring-shaped body 69. A cutter holder 80 is fixed to the lower end of the lifting shaft 79, and a cutter 81 is fixed to the cutter holder 80 by means of a screw.

Figure 3:
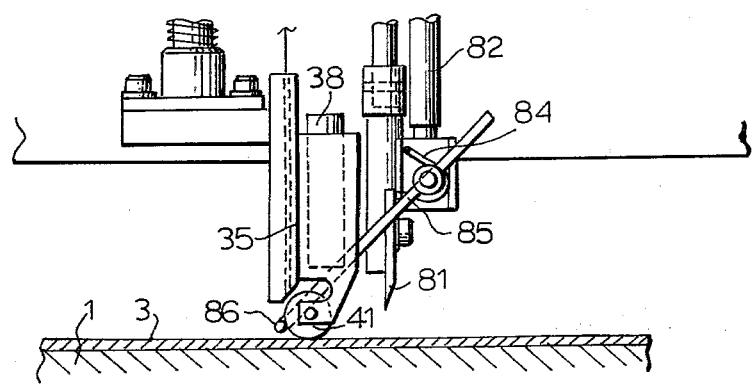
FIG. 3 is a sectional view of an essential part of the device of FIGS. 1 and 2.

The upper end of a vertical shaft 82 is fixed to the annular body 14, and a lateral shaft 83 is rotatably mounted in a lateral hole in the lower end of the vertical shaft 82, and the lateral shaft 83 is urged in the counterclockwise direction in FIG. 3 by the force of a coil spring 84. A support shaft 85 is coupled to the lateral shaft 83, and a holding roller 86 is rotatably mounted on the tip of the shaft 85 and is held in resilient contact with the lower portion of the circumferential surface of the pressure roller 41. A vertical lever 87 is fixed to the member 42, and a transfer shaft 89 is slidably positioned into a vertical hole in a mounting lever 88 fixed to the upper end of the lever 87 at right angles thereto. A lower saucer-shaped end portion 189a of the transfer shaft 89 rests on the coiled wire 90 due to its own weight. A microswitch 92 on lever 88 is disposed in the path of a descending flange 91 fixed to the upper end of the transfer shaft 89.

The wire 90 such as copper wire coiled on the bobbin 63 is held between the pressure roller 41 and the holding roller 86, being fed thereto through the guide roller 64, tension roller 65, guide groove 66, lateral hole 67, and a guide groove 68 in the wire guide shaft 61 and the guide groove 40 in the holder member 35, and is thus supplied onto the mounting table 1. A lead connected to the heater 38 is connected to screws 50 and 56 through terminal 95, the space within tubular body 44 and the support pipe 45 not occupied by the wire guide shaft 61. Voltage is supplied to the screws 50 and 56 from the screws 52 and 54 connected to the power source through the thrust ball bearings 47 and 48.

At the start of the operation when the lifting plate 8 is at the highest position, the pressure roller 41 is spaced slightly from the upper surface of the mounting table 1. When the roller 12 is shifted in the downward direction upon energizing the rotary solenoid 11, the horizontal plate 10 is driven down, and the lifting plate 8 is lowered a predetermined distance against the force of the coil spring 7. When the lifting plate 8 moves down, the pressure roller 41 contacts the upper surface of the sheet of thermoplastic 3 on the mounting table 1. At the time the roller 41 contacts the sheet 3, the guide pipes slide slightly upwardly along the shafts 32 against the action of the springs 37 so that the pressure roller 41 is in resilient contact with the sheet of thermoplastic 3 with a force sufficient, when the thermoplastic 3 is plasticized, to embed the wire 90 in the thermoplastic. At this point, the rotary solenoid 11 is deenergized, and the descending motion of the lifting plate 8 is stopped. At this time, the wire 90 disposed between the pressure roller 41 and the holding roller 86 is pressed against the surface of the sheet of thermoplastic sheet 3. At this time, the tip 81a of the cutter 81 is spaced slightly above the surface of the sheet 3. Electric power is supplied to the heater 38, and while the heater is in the heated condition, the head 2 is shifted by the direction control motor 16 in the predetermined direction under the control of a control system. Drive signals supplied to MX and MY motors for shifting the head 2 in the directions of the X-Y coordinates are combined in a vector mode by a mixer, for example in the manner as shown in the above mentioned U.S. Pat. No. 3,715,945, and the composite signal is supplied to the direction control motor 16. The pinion gear 17 fixed to the output shaft of the motor 16 is rotated and is transmitted to the annular body 14 by means of the gears 18, 21, 22, 25 and 15, and the holder member 35 and the pressure roller 41 are rotated about a vertical axis so that the side plates 35a are constantly parallel to the direction of advance of the head 2. The cutter holder 80 being mounted on the annular body 14, the cutter 81 is also constantly rotated so that the cutting edge 81a parallel to the upper surface of the mounting table 1 is at right angles to the advancing direction of the pressure roller 41 and is also constantly positioned to the rear of the pressure roller 41 with respect to the advancing direction of the head 2.

When the head 2 is shifted, the pressure roller 41 travels and rotates and forces the wire 90 under pressure into the surface of the sheet of thermoplastic 3. The wire 90 is continually unrolled from the bobbin 63, and the wire 90 is continually delivered onto the surface of the sheet of thermoplastic 3. When the wire 90 slides over the corners a and b at the opposite ends of the lateral hole 68 in the wire guide shaft 61, any curvature is corrected by the corner portions a and b which straighten the wire out. The wire 90 is delivered to the surface of the sheet of bonding agent 3 after having been sufficiently heated by the heater 38 so that even after it has travelled from the heater 38 and around the roller 41 there is still sufficient heat therein to plasticize the thermoplastic 3 and therefore, when it is pressed against the surface of the thermoplastic sheet 3 by the pressure roller 41, the heat from the wire 90 plasticizes the thermoplastic and the pressure of pressure roller 41 forces the wire into the surface of the sheet of thermoplastic 3, thus embedding it therein. When the wire 90 on the bobbin 63 is used up, the disc 91 comes into contact with the movable switch member of the microswitch 92, and the microswitch is closed and the necessity to supply further wire 90 is indicated by the lighting of the lamp 96.

Figure 2:
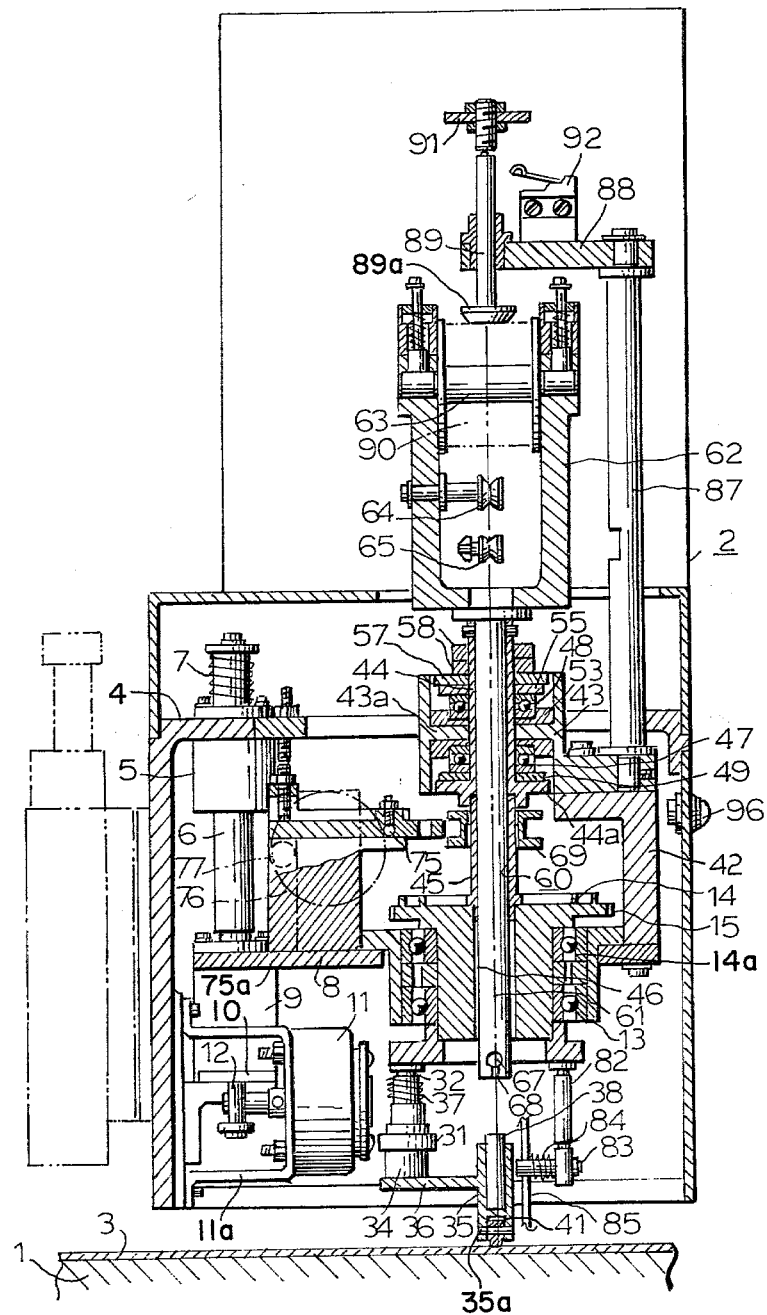
FIG. 2 is a cross-sectional view of the embodiment of FIG. 1 taken at right angles to the view of FIG. 1.

When it is desired to cut the wire, the rotary solenoid 76 is energized, and the rocking arm 71 is turned in the clockwise direction in FIG. 2 about the pivot 75 and when the ring body 69 is pushed down against the force of the spring 70, the shaft 79 is lowered, and the cutting edge 1a of the cutter 81 cuts the wire 90. When the solenoid 76 is deenergized, the cutter 81 rises and returns to the original position due to the force of the spring 70. Further, when the solenoid 11 is deenergized, the lifting plate 8 rises a predetermined distance due to the force of the coil springs 7, and the pressure roller 41 is raised a predetermined distance above the surface of the sheet of thermoplastic 3. At this time, because the lower portion of the wire 90 is resiliently held in contact with the lower portion of the circumferential surface of the pressure roller 41 by the holding roller 86, the lower portion of the wire 90 is held against the lower part of the circumferential surface of the pressure roller 41 by the holding action of the holding roller 86 and the deformation of the wire itself along the circumferential surface of the pressure roller 41, so that the lower portion of the wire 90 seldom escapes from the lower part of the pressure roller 41.

The wire guide shaft 61 can be easily pulled out of the bore 60, and when a full bobbin 63 is being mounted on the apparatus, the bobbin 63 is rotatably mounted on the support frame 62 only after the wire guide shaft 61 is pulled out of the passage 60, and the lead portion of the wire 90 is led into the guide groove 66, lateral hole 67 and guide groove 68, and thereafter the wire guide shaft 61 is merely inserted into the passage 60, whereby the wire 90 can be simply fed to the pressure roller 41.

It will be understood that the heating device 38 is to be located at a position where it does not heat the thermoplastic sheet 3 or the roller 41 directly, and yet it heats the metallic antenna wire sufficiently that the wire is still sufficiently hot when it comes into contact with the thermoplastic sheet after going at least part way around the roller 41 so that it will plasticize the thermoplastic of the sheet 3. On the other hand, heating of the roller 41 to any great degree must be avoided, because if it becomes too hot, it will plasticize the thermoplastic of the sheet and the material of the sheet will adhere to the roller, thus making it impossible to properly embed the wire 90 in the material of the sheet 3. On the other hand, the heater 38 should not be located too far from the pressure roller 41, because it will make it necessary to heat the wire 90 to too high a temperature and the heat loss from the wire during the time it travels from the heater to the pressure roller too large. In practice it has been found, as shown in FIG. 3, that by mounting the roller 41 on a downwardly and then laterally extending arm beneath the heater 38, sufficient air space is left between the heater and the roller 41 so that no significant amount of heat is transferred to the roller from the heater. The roller should also be sufficiently large to radiate enough heat picked up from the wire 90 to keep its temperature below the plasticizing temperature of the thermoplastic sheet 3.

The apparatus of the present invention, constructed in the manner described in the foregoing, makes possible continuous embedding of the wire into the sheet of thermoplastic material in a predetermined pattern. The efficiency of the operation is improved. Moreover, since the means for pressing the wire against the surface of the thermoplastic i.e. the roller 41, is not itself heated, there is no chance that the surface of the sheet of thermoplastic material will be made molten by the pressure means itself. On the part contacted by the heated wire will be plasticized. Thus the embedding of the wire can be performed with satisfactory results. In addition, there is no chance that the wire will be heated to an unnecessarily high temperature.

What is claimed is:

1. A device for embedding a metallic antenna wire in a sheet of thermoplastic material comprising a mounting table for mounting the sheet of thermoplastic material thereon, a guide head positioned above said table, guide head moving means coupled to said guide head for moving said guide head in any direction in a plane parallel to said surface of said table, a pressure roller on said guide head for pressing the wire against the sheet as the guide head moves parallel to the table with a force sufficient, when the thermoplastic material is plasticized, to embed the wire in the thermoplastic material, said pressure roller having a shallow groove in the periphery thereof for guiding the metallic antenna wire therearound, a holding roller resiliently engaging the lower portion of the peripheral surface of said pressure roller at a point spaced from the point closest to said table in the direction from which the metallic wire is guided toward said table for holding said metallic wire against said pressure roller, wire supplying means on the guide head consisting of a guide shaft and a supply bobbin for supplying the metallic antenna wire to the pressure roller in a direction perpendicular to said table, heating means on the guide head along the path of the wire from the wire supplying means to the pressure roller for heating the wire to a temperature for plasticizing the thermoplastic material when the pressure roller presses the heated wire against the sheet of thermoplastic material, said heating means being spaced along the path of said metallic antenna wire before said pressure roller relative to the direction of movement of the wire sufficiently far to avoid directly heating said pressure roller, a cutter mounted on said head for movement relative to said head toward and away from said table, said cutter being positioned adjacent said pressure roller in a direction from said pressure roller in which the wire which has been pressed into the sheet trails away from the pressure roller, cutter actuating means on said head coupled to said cutter for moving said cutter against said table for cutting the wire and retracting it from the table when the wire has been cut, said wire supplying means, said pressure roller and said cutter being mounted on said head for rotation relative to said head around said wire as the axis of rotation, and drive means coupled to said wire supplying means, said pressure roller and said cutter and to which said head moving means is coupled for rotating said wire supplying means, said pressure roller and said cutter around said axis in response to the changes in direction of said guide head in the movement of said head parallel to the table for always orienting said pressure roller in the direction in which said head is moving and orienting said cutter for trailing said pressure roller relative to the direction in which the head is moving.

2. An apparatus as claimed in claim 1 in which said guide head further has a guide roller and a tension roller thereon positioned along the path of the wire moving from said supply bobbin to said pressure roller for tensioning the metallic wire.

3. An apparatus as claimed in claim 1 wherein said metallic antenna wire guide shaft has a pair of corners thereon in spaced relationship in the direction of movement of said metallic antenna wire and located at the end of said wire guides closest to said pressure roller.

* * * * *